April 17, 1962     H. W. WRIGHT, JR., ET AL     3,029,946
CLAMPING MEANS FOR MATERIAL SEPARATORS Filed March 28, 1960     2 Sheets-Sheet 1

HOWARD W. WRIGHT JR.
LLOYD SPENCER
INVENTORS

BY

ATTORNEYS

HOWARD W. WRIGHT JR.
LLOYD SPENCER
    INVENTORS

BY Lyon Lyon
    ATTORNEYS

United States Patent Office 3,029,946
Patented Apr. 17, 1962

3,029,946
CLAMPING MEANS FOR MATERIAL SEPARATORS
Howard W. Wright, Jr., San Gabriel, and Lloyd Spencer, Los Angeles, Calif., assignors to Southwestern Engineering Company, Vernon, Calif., a corporation of California
Filed Mar. 28, 1960, Ser. No. 17,973
2 Claims. (Cl. 209—405)

This invention relates to clamping means for material separators, more particularly to clamping means for the type of material separator shown in the Meinzer Patent No. 2,284,671, issued June 2, 1942, entitled "Shaking Device," and also disclosed in the copending application of Robert J. McCausland, filed March 28, 1960, Serial No. 17,915, entitled Shaking Apparatus.

Included in the objects of this invention are:

First, to provide a clamping means for material separators which is arranged to join succeeding cylindrical sections or units of the material separator in such a mannert that they may be readily separated or joined, yet is particularly adapted to withstand the vibrations to which apparatus of this type are subjected.

Second, to provide a clamping means for material separators wherein parallel flanges of succeeding sections of the material separators are forced axially away from each other and against mating parallel flanges of a clamp ring by effecting radial compression and axial expansion of a distortable sealing ring.

Third, to provide a clamping means for material separators which by employing a clamp ring having parallel flanges, as distinguished from diverging flanges, and utilizing mating parallel flanges of the sections of the separator, permit the uppermost flange of the clamp ring to rest freely on and be supported by the corresponding flange of the separator section before the clamp ring is drawn tight, thereby facilitating the installation of clamp rings on separators of large diameter.

With the above and other objects in view, as may appear hereinafter, reference is directed to the accompanying drawings in which.

Figure 1:
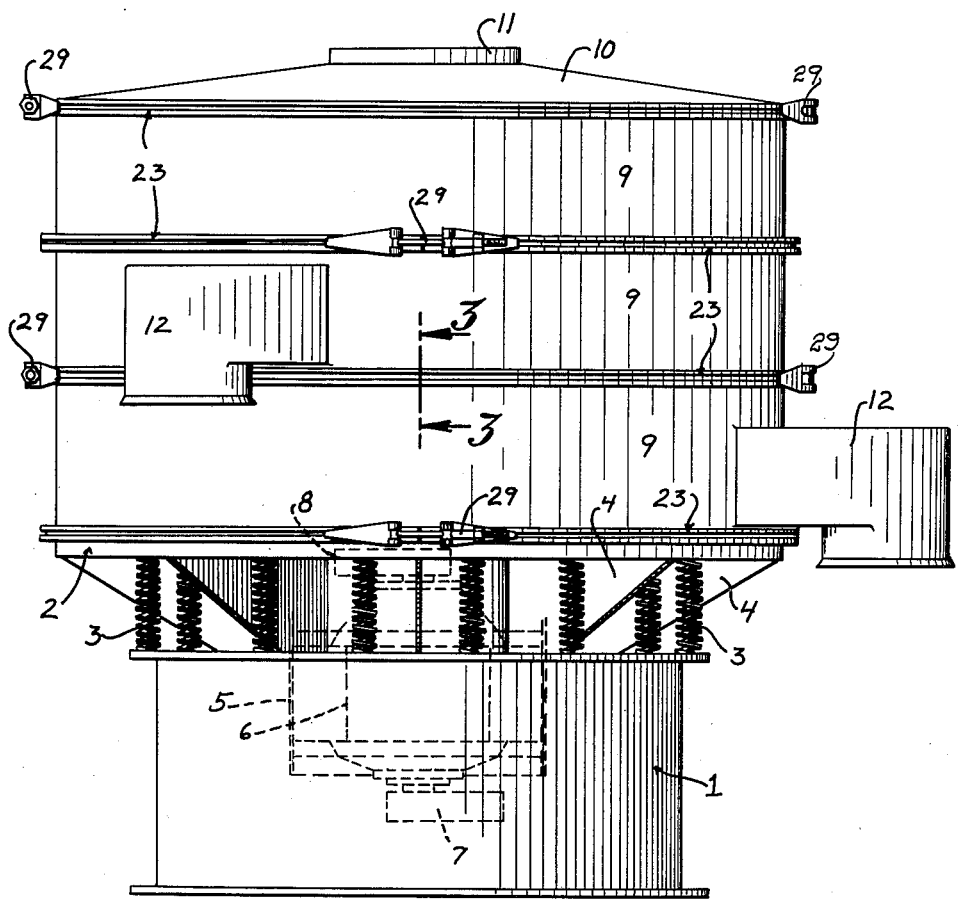
FIGURE 1 is an elevational view of a material separator incorporating the clamping means.
Figure 2:
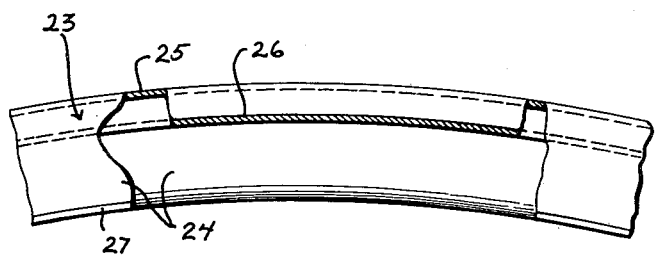
FIGURE 2 is a partial sectional, partial top view of the clamping ring.

The separator structure for which the clamping means is particularly adapted includes a cylindrical base 1 above which is mounted a bottom assembly 2 supported on a plurality of springs 3. The bottom assembly 2 includes radially inwardly extending ribs 4 which support a cylindrical motor shell 5 projecting downwardly within but clearing the base 1. The motor shell supports therein an electric motor 6 having eccentric weights 7 and 8 at its lower and upper ends.

Mounted on the base 1 is a stack or series of cylindrical sections 9, and if desired a cover 10. The cover 10 is provided with an inlet 11, and each cylindrical section is provided with a radially extending outlet spout 12.

Each of the cylindrical sections 9 is provided at its axial extremities with radially outwardly directed flanges 13. Interposed between these flanges are mounting rings 14. The mounting rings between the intermediate pairs of flanges 13 are arranged to support circular screens 15, as shown fragmentarily in FIGURE 3. The peripheral portions of the screens 15 may be secured to the mounting rings 14 by means of clamp rings 16 which are spot welded, as indicated by 17, through the screens to the mounting rings. A sealing and bonding material 18 may also be provided around the periphery of the screens.

Figure 3:
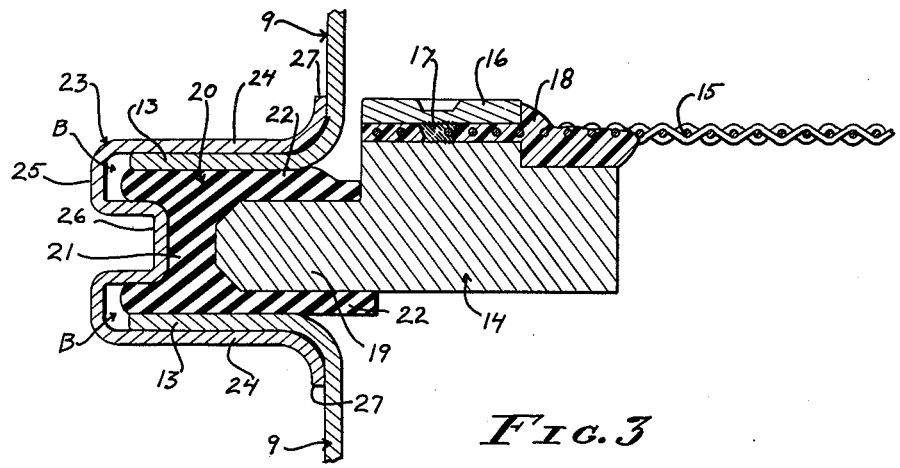
FIGURE 3 is an enlarged, fragmentary, sectional view through 3—3 of FIGURE 1 showing fragmentarily adjacent sections of the separator structure joined by the clamping means.

That portion of the mounting ring 14 which projects between the flanges 13 is preferably in the form of an annular lip 19 of lesser thickness than the main portion of the mounting ring, as shown best in FIGURE 3. Fitted over the lip 19 is a seal ring 20 formed of rubber or other elastomer. The seal ring is essentially U-shaped in cross section to form a relatively thick body portion 21 disposed radially outwardly from the lip 19. Relatively thin flanges 22 are interposed between the lip 19 and the flanges 13 of the adjacent cylindrical sections 9.

The flanges 13, which are relatively parallel, are adapted to be embraced by a clamp ring 23 having substantially parallel flanges 24. The clamp ring is essentially E-shaped in cross-section. That is, its cross portion 25 is provided with a radially inwardly directed displacement ridge or element 26 disposed between the flanges 24, and may have an axial dimension approximating that of the lip 19 so that clearance is provided between the axial sides of the displacement ridge 26 and the flanges 13 of the separator structure when the clamp ring is fitted thereon, as shown in FIGURES 3 and 4.

The radially inner extremities of the flanges 24 of the clamp ring 23 are preferably turned outward or axially from each other to form lips 27. The clamp ring is formed in two or more sections which are provided with end fittings joined by draw bolts 29. The end fittings and draw bolts may be of the type more fully disclosed in the patent to King No. 2,395,745, issued February 26, 1946.

Figure 4:
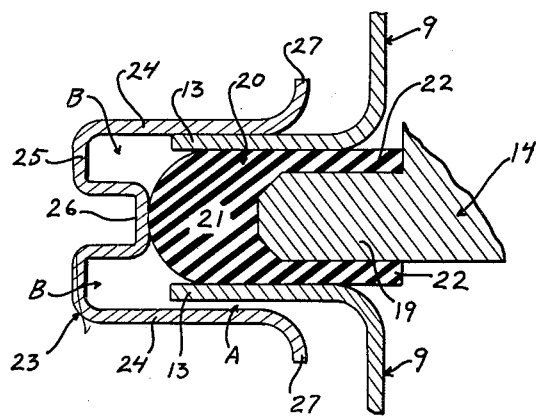
FIGURE 4 is a fragmentary, sectional view similar to FIGURE 3, showing the clamping means before constriction about the sections of the separator structure.

Operation of the clamping means is as follows:

A pair of cylindrical sections 9 of the separator structure is stacked, one upon the other, with a mounting ring 14 fitted with the seal ring 20 interposed therebetween, substantially as shown in FIGURE 4. A clamp ring 23 is then positioned around the confronting portions of the cylindrical sections with the flanges 24 of the clamp ring overlying the flanges 13 of the cylindrical sections as shown in FIGURE 4. Preferably the normal spacing between the flanges 13 as determined by the seal ring 20 is such that the flanges 24 of the clamp ring may fit freely thereover or with slight clearance, as indicated by A in FIGURE 4.

The flanges 24 project radially inward with respect to the displacement ridge 26 so that the clamp ring may be supported on the uppermost flange 13 before the displacement ridge 26 is brought into contact with the body 21 of the seal ring. It will be noted that, as shown in FIGURE 4, when the displacement ridge 26 is in nominal contact with the body 21 there are spaces B above and below the displacement ridge. When the draw bolts 29 are tightened to constrict the clamp ring 23, the displacement ridge 26 presses radially inward on the body 21 so as to compress the body radially. This causes the body to spread or expand axially against the flanges 13 which forces these flanges axially away from each other and against the flanges 24.

It is preferable to proportion the body 21 and clamp ring 23 so that the lips 27 of the clamp ring bottom against the cylindrical sections 9 before the body 21 has been distorted so as to completely fill the spaces B, as shown in FIGURE 3. Some axial distortion of the flanges 22 of the seal ring, particularly the upper flange, also occurs, so that a fluid-tight seal is formed between the flanges 13. By reason of the fact that the clamp ring firmly bottoms against the cylindrical sections 9, the several sections are firmly held in axial alignment.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. (a) A clamping and sealing means for interconnecting adjacent flanged ends of a pair of circular members, an interposed mounting ring, said means comprising:

(b) a seal ring initially U-shaped in cross section and forming a relatively thick, distortable cross portion disposed radially outwardly of said mounting ring, and radially inwardly directed lips interposed between opposite sides of said mounting ring and said flanged ends;

(c) a constrictible clamping ring including flange elements fitting over said flanged ends to limit axial separation, and a radially inwardly constrictible displacement member disposed between said flanged ends to engage the cross portion of said seal ring, to distort said seal ring into an H-shape cross section by radially compressing said cross portion thereof against the periphery of said mounting ring and displace the material axially to effect a seal between said mounting ring and flanged ends, and to force said flanged ends into firm engagement with said flange elements.

2. (a) A sectional material separator, comprising:

(b) a series of cylindrical sections, each having radially outwardly directed flange members at its axial extremities;

(c) a series of mounting rings;

(d) seal rings formed of distortable material and initially U-shaped in cross section, and including relatively thick cross portions fitted over the peripheries of said mounting rings and lips extending radially inwardly over the axial margins of said mounting rings;

(e) said mounting rings and the lips of said seal rings being interposed between flange members of adjacent cylindrical sections;

(f) and a constrictible clamp ring including flange elements fitting over each pair of flange members to restrain said flange members against axial separation, and an annular displacement element between said flange elements and flange members for radial inward engagement with the cross portion of said seal ring to compress said cross portion radially, thereby to displace said cross portion axially into sealing engagement with said flange members and force said flange members into firm engagement with said flange elements.

References Cited in the file of this patent

UNITED STATES PATENTS

| | | |
|---|---|---|
| 1,376,216 | Mittinger | Apr. 26, 1921 |
| 1,607,943 | Carson | Nov. 23, 1926 |
| 2,028,182 | Barnickel | Jan. 21, 1936 |
| 2,777,578 | Miller | Jan. 15, 1937 |

FOREIGN PATENTS

| | | |
|---|---|---|
| 567,632 | Canada | Dec. 16, 1958 |